United States Patent [19]

Stephenson et al.

[11] B 3,995,788

[45] Dec. 7, 1976

[54] VEHICLE SENSITIVE RETRACTOR WITH IMPROVED UNIVERSAL PENDULUM AND GIMBAL

[75] Inventors: Robert L. Stephenson, Sterling Heights; Robert C. Pfeiffer, Rochester; Yogendra Singh Loomba, Washington, all of Mich.

[73] Assignee: Allied Chemical Corporation, Morris Township, N.J.

[22] Filed: July 10, 1974

[21] Appl. No.: 487,427

[44] Published under the second Trial Voluntary Protest Program on March 2, 1976 as document No. B 487,427.

[52] U.S. Cl. .................................. 242/107.4 A
[51] Int. Cl.$^2$ .................................. B65H 75/48
[58] Field of Search .......... 242/107.4, 107 SB, 107; 280/150 SB; 297/388

[56] References Cited
UNITED STATES PATENTS

| | | | |
|---|---|---|---|
| 3,489,367 | 1/1970 | Kovacs et al. | 242/107.4 |
| 3,552,676 | 1/1971 | Weber | 242/107.4 |

Primary Examiner—Leonard D. Christian
Attorney, Agent, or Firm—John P. Kirby, Jr.

[57] ABSTRACT

The vehicle-sensitive retractor has an improved universal support assembly and pendulum assembly. The support is a gimbal assembly which includes: a pivot ring, a swivel axis for the pivot ring, a trunnion, a swivel axis for the trunnion, and a support member for the trunnion. The pivot ring has an aperture in its bottom central portion through which a pendulum rod extends and a circular support edge upon which a pendulum head is disposed for pivoting movement. The pivot ring is supported by the trunnion, which in turn is supported by the support member for the trunnion. The pivot ring is adapted to pivot in two directions upon its swivel axis with reference to the trunnion. The trunnion is adapted to pivot in two directions upon its swivel axis with reference to the support member for the trunnion. The swivel axis of the pivot ring is disposed approximately perpendicular to the swivel axis for the trunnion. The gimbal assembly is adjustable to an infinite variety of operable static positions according to the position in which the retractor is installed in the vehicle. The retractor may be tilted for installation without having to redesign the pendulum assembly and support assembly.

6 Claims, 3 Drawing Figures

VEHICLE SENSITIVE RETRACTOR WITH IMPROVED UNIVERSAL PENDULUM AND GIMBAL

BACKGROUND OF THE INVENTION

1. Field of the Invention

This invention relates to safety belt retractors for occupants of vehicles, such as automobiles. More particularly, this invention relates to an inertia responsive safety belt retractor which is vehicle-sensitive. Such a retractor is responsive to acceleration, deceleration or change in orientation of the vehicle, which may result from cornering, braking or overturning of the vehicle. In response thereon, the retractor locks to prevent further withdrawal of the safety belt. Still more particularly, this invention relates to an improved, universal inertia mechanism and support assembly which allows the retractor to be placed in a variety of positions within the vehicle.

2. Description of the Prior Art

Vehicle sensitive safety belt retractors have been recently developed which should significantly decrease the number of fatalities and serious injuries resulting from motor vehicle accidents. Most of these retractors use a vehicle sensitive mechanism having a pendulum assembly. Typically, such retractors also include a belt reel which is continually biased in a retracting direction and a pawl which is engagable with a ratchet wheel on the belt reel. When the pendulum assembly is displaced from its normally vertical position by acceleration, deceleration or change in orientation of the vehicle, the pendulum assembly moves the pawl into engagement with the ratchet wheel, preventing further withdrawal of the belt. U.S. patent application Ser. No. 312,534 filed Dec. 6, 1972 in the name of Lon E. Bell discloses an example of such a retractor.

It is important for the pendulum assembly to be in a substantially vertical position prior to actuation by acceleration, deceleration or change in orientation of the vehicle, so that the safety belt can be moved without locking the belt reel. It is desirable to have an improved, universal inertia mechanism which is adjustable and does not need to be redesigned for different vehicles, in order to have the pendulum assembly disposed substantially vertically in its static position prior to actuation. This is desirable because the retractor needs to be mounted in various positions and various orientations within different vehicles. Sometimes the retractor needs to be turned partly on its side.

SUMMARY OF THE INVENTION

The retractor of this invention is vehicle-sensitive and inertia-operated. The retractor has a reel for winding a safety belt, means to lock the reel and thereby restrain an occupant of a vehicle during emergency situations, an improved inertia mechanism, an improved support mounted on the retractor for supporting the inertia mechanism, and an improved actuating means responsive to the inertia mechanism for operating the means for locking the reel. The inertia mechanism is a pendulum assembly which includes a pendulum head in contact with the actuating means. The support for the pendulum assembly is a gimbal assembly which includes a pivot ring, a swivel axis for the pivot ring, a trunnion, a swivel axis for the trunnion and a support member for the trunnion. The pivot ring has a substantially circular support edge upon which the pendulum head is disposed so that the pendulum assembly is adapted to pivot upon the support edge in an infinite variety of lateral directions. The swivel axis for the pivot ring is adapted to allow the pivot ring to pivot in two lateral directions. The trunnion is adapted to support the pivot ring. The swivel axis for the trunnion is adapted to allow the trunnion to pivot in two lateral directions. The trunnion swivel axis is disposed approximately perpendicular to the pivot ring swivel axis. The support member is adapted to support the trunnion. As a result, the gimbal assembly is adapted to pivot in any lateral direction to an infinite variety of operable static positions to which the gimbal assembly is adjustable according to the position in which the retractor is oriented by virtue of installation in the vehicle.

The pivot ring may be any concave vessel having an aperture in its bottom central portion through which a pendulum rod extends. The pivot ring is supported by the trunnion, which in turn is supported by the support member for the trunnion. The retractor has three separate pivoting actions: (1) the pivoting action between the pendulum assembly and the pivot ring; (2) the pivoting action between the pivot ring and the trunnion; and (3) the pivoting action between the trunnion and the support member. The gimbal assembly is adapted to pivot in an infinite variety of lateral directions because of the two directional pivoting of the pivot ring in combination with the two directional pivoting of the trunnion. In response to inertia forces during emergency situations, the pendulum assembly may pivot in an infinite variety of lateral directions.

The actuating means is disposed above the pendulum head. Typically, the reel locking means includes one or more ratchet wheels and a pawl, although other reel locking means may also be used. The actuating means is an actuating post which has an unlocked position and a locked position. The actuating post is disposed in the unlocked position when the support assembly is in any one of its infinite variety of operable static positions. The actuating post is moved to the locked position by movement of the pendulum assembly during emergency situations to engage the pawl in the ratchet wheels and thereby lock the reel and prevent further unwinding of the belt from the reel.

The retractor has a longitudinal axis. The gimbal assembly has a longitudinal axis which is approximately perpendicular to the swivel axis for the pivot ring. The static position of the gimbal assembly is adjustable in any direction from a static position wherein the longitudinal axis of the gimbal assembly is disposed at an angle of approximately 0° to an angle of approximately 30° with reference to the longitudinal axis of the retractor. The retractor further includes a support structure including two parallel side walls and a back wall. The support member for the trunnion is disposed between the side walls. The inertia mechanism and support mechanism are universal and unique because they do not have to be redesigned for use in different vehicles in order to have the pendulum assembly disposed substantially vertically for the purpose of allowing the retractor to remain unlocked in normal operation. If the retractor is turned partly on its side, that is, tilted for installation, the static position of the gimbal assembly is automatically adjustable to such tilted installation of the retractor and enables the pendulum assembly to be disposed substantially vertically.

DETAILED DESCRIPTION

Figure 1:
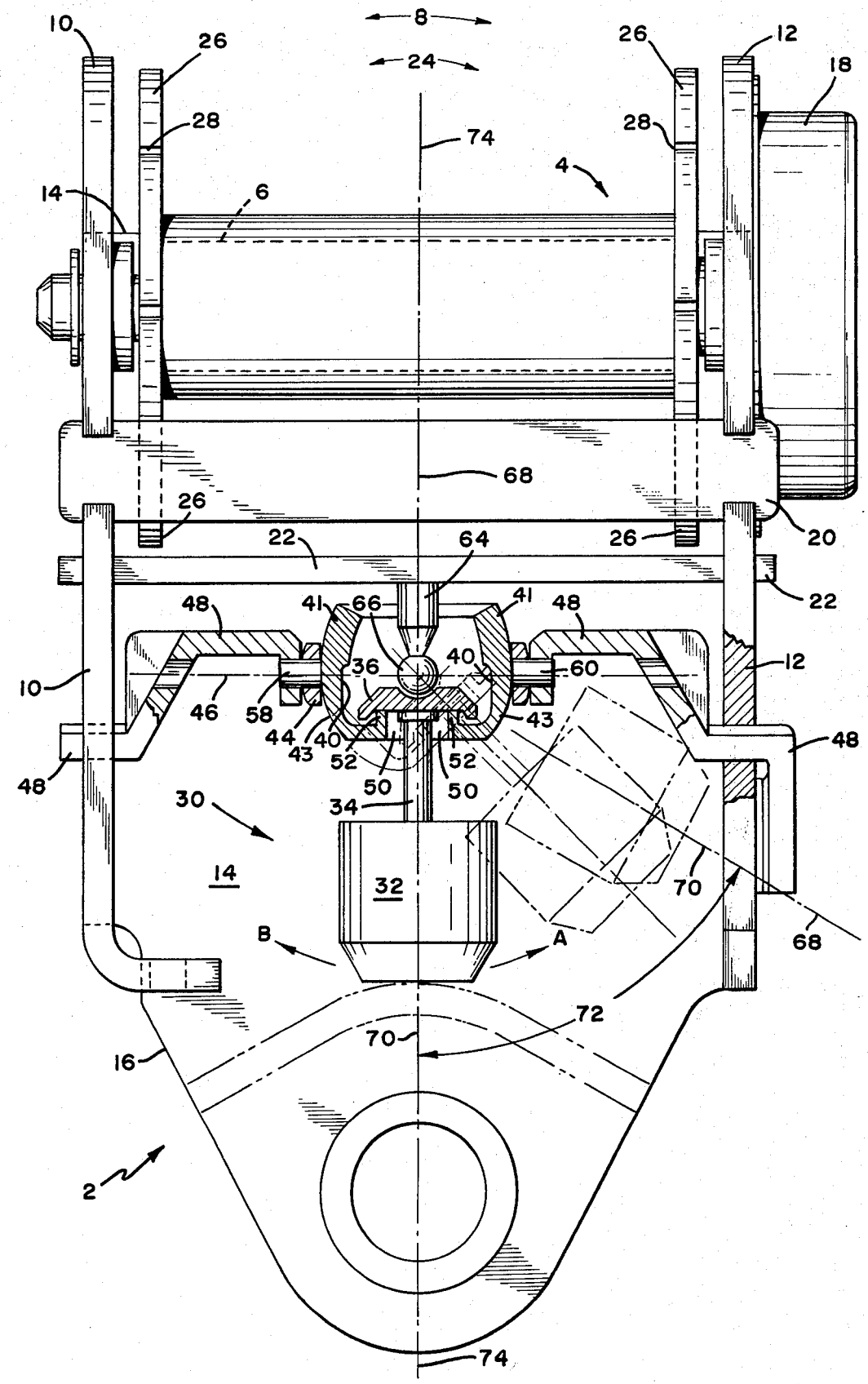
FIG. 1 is a front elevational view of the retractor of this invention having an improved inertia mechanism, support assembly and actuating means.
Figure 2:
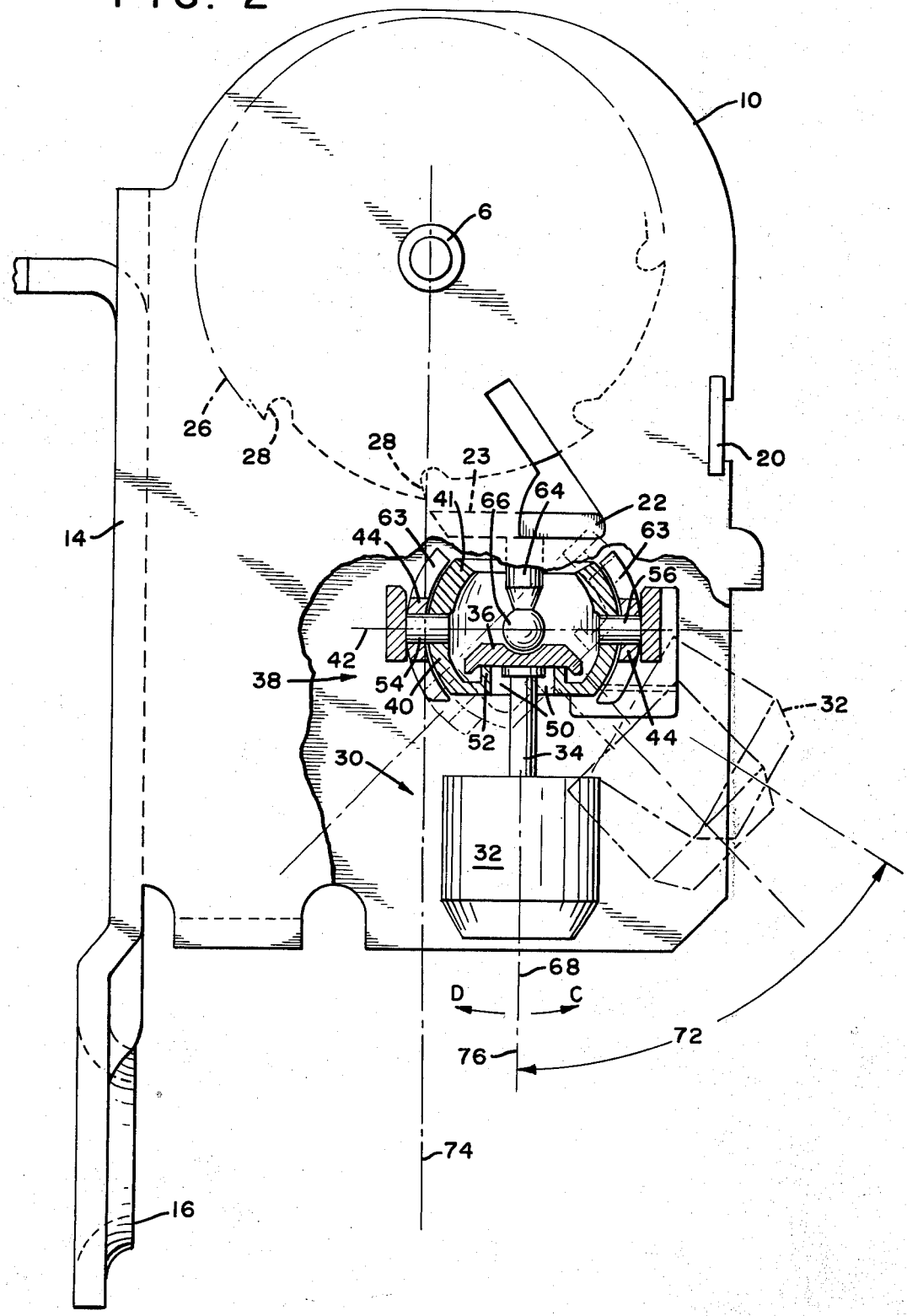
FIG. 2 is a side view of FIG. 1 with a portion broken away to show the improved inertia mechanism, support assembly and actuating means.
Figure 3:
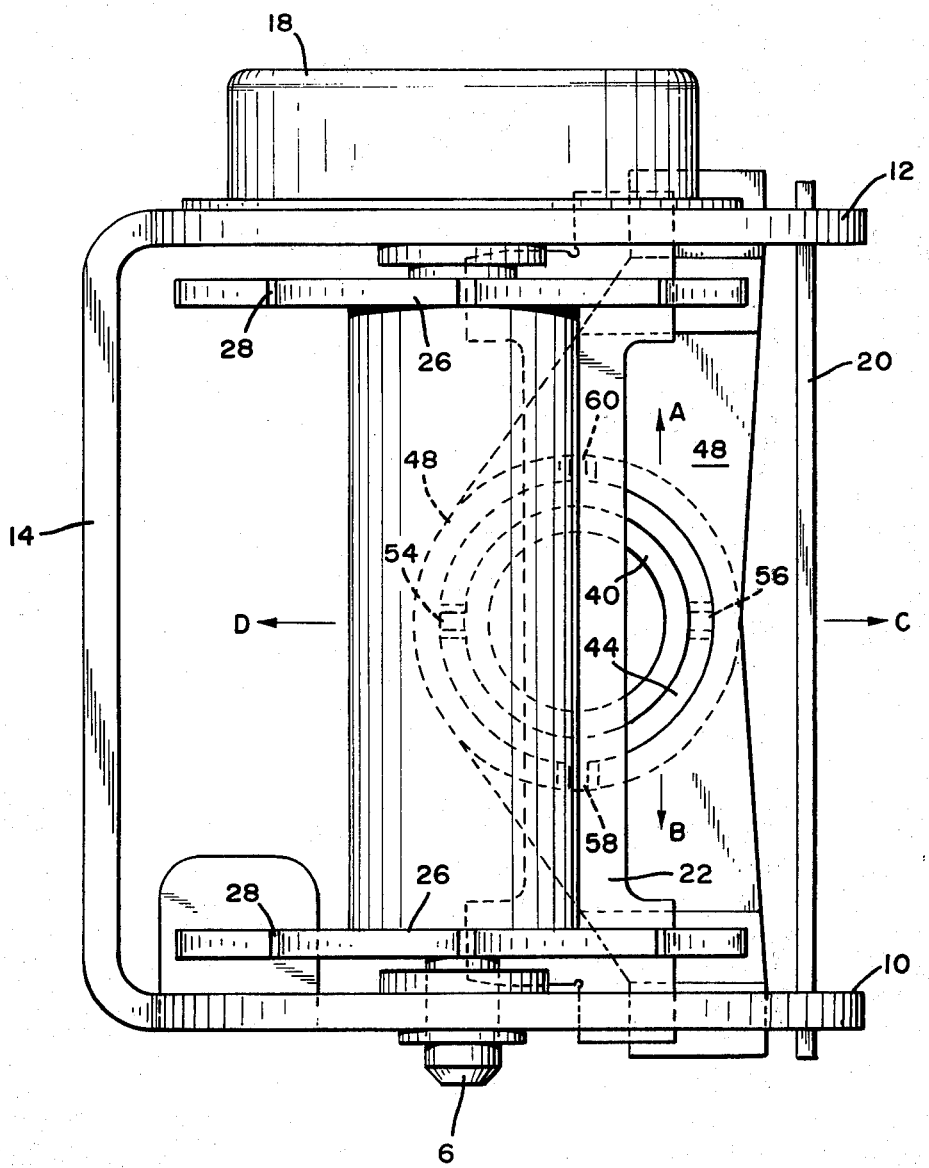
FIG. 3 is a top view of FIG. 2.

Referring to FIGS. 1, 2 and 3, the retractor, referred to generally by the numeral 2, has a reel means 4, including a reel shaft 6, rotatably mounted on a support means 8. The support means 8 is a load bearing member and includes two side walls 10 and 12 and a back wall 14. The support means 8 also includes a mounting means 16 in the form of a rigid extension adapted to be bolted or otherwise secured to an anchorage point in a vehicle (not shown).

A belt (not shown) is adapted to be attached to the reel shaft 6 for winding and unwinding thereon. The reel means 4 includes a biasing means, such as a spiral return spring, inside a housing 18, which urges the reel shaft 6 to turn in a winding direction. The winding direction of the reel shaft 6 retracts the belt into the retractor 2. The opposite unwinding direction of the reel shaft 6 allows withdrawal of the belt from the retractor 2.

The two side walls 10 and 12 of the support structure 8 are disposed substantially parallel to one another and substantially perpendicular to the back wall 14. The support structure 8 also includes a cross member 20 extending between the side walls 10 and 12 and at the opposite side of the side walls 10 and 12 from the back wall 14.

The retractor further includes a means for locking the reel means 4, such as a pawl 22 and a ratchet means 24. The ratchet means 24 includes at least one ratchet wheel 26 and, preferably, two ratchet wheels 26. The ratchet wheels 26 have ratchet teeth 28 (FIG. 2) on their outer circumferences and are fixedly mounted on the reel shaft 6.

The pawl 22 is pivotally mounted on the side walls 10 and 12 and extends between the side walls 10 and 12. The pawl 22 is adapted to pivot from an unlocked position, shown in FIG. 2 by dasked lines, to a locked position. In the locked position, the pawl 22 is pivoted into engagement with the ratchet wheels 26.

The retractor 2 further includes an inertia mechanism, a support for the inertia mechanism and an actuating member, all of which are adapted to cooperate to actuate the pawl from its unlocked position to its locked position during emergency situations. The inertia mechanism, support mechanism and actuating member may be mounted inside the retractor, as illustrated in the drawings, or outside the retractor on the outer side of one of the side walls 10 or 12 of the support structure 8. The inertia mechanism is a pendulum assembly 30 which is best shown in FIGS. 1 and 2. The pendulum assembly 20 includes a pendulum weight 32, a pendulum rod 34 and a pendulum head 36. The pendulum rod 34 has an upper end and a lower end. The upper end of the pendulum rod 34 is connected to the pendulum head 36. The lower end of the pendulum rod 34 is connected to the pendulum weight.

The support for the pendulum assembly is a gimbal assembly, referred to generally by the numeral 38. The gimbal assembly 38 includes a pivot ring 40, a swivel axis 42 for the pivot ring 40 (FIGS. 2 and 3), a trunnion 44, a swivel axis 46 for the trunnion 44 and a support member 48 for the trunnion 44. The pivot ring 40 may be any concave vessel, such as a vessel having either a cup shape, or an inverted dome shape, or an inverted conical shape. The pendulum rod 34 extends from the pendulum head 36 through an aperture 50 in a bottom central portion of the pivot ring 40. The pivot ring 40 has an upturned, substantially circular support edge 52 around the circumference of the aperture 50 upon which the pendulum head 36 is disposed within the pivot ring 40.

The swivel axis 42 for the pivot ring 40 is disposed substantially perpendicular to the back wall 14 and substantially parallel to the side walls 10 and 12. The swivel axis 42 for the pivot ring 40 is formed by two aligned axles 54 and 56, one axle on each of two opposing sides of the pivot ring 40. The axles 54 and 56 of the pivot ring 40 extend into and are journaled in the trunnion 44. The trunnion 44 thereby supports the pivot ring 40 and the pendulum assembly 30. The pivot ring axles 54 and 56 enable the pivot ring 40 to pivot with reference to the trunnion 44 in two lateral directions indicated by arrows A and B in FIGS. 1 and 3.

The swivel axis 46 for the trunnion 44 is disposed substantially perpendicular to the side walls 10 and 12 and substantially parallel to the back wall 14. The swivel axis 46 for the trunnion 44 is formed by two aligned axles 58 and 60 at each of two opposing sides of the trunnion 44. The trunnion axles 58 and 60 extend into and are journaled in the support member 48 which supports the trunnion 44. Indirectly, the support member 48 also supports the pivot ring 40 and the pendulum assembly 30. The support member 48 is fixedly mounted on, supported by, and extends between side walls 10 and 12. The trunnion axles 58 and 60 enable the trunnion 44 to pivot in two lateral directions, indicated by arrows C and D in FIGS. 2 and 3. The trunnion 44 is provided with suitable tracks 63 within which the swivel axles 54 and 56 move in order to allow the pivot ring 40 to pivot in the lateral directions indicated by arrows A and B. The pivot ring 40 has upper side walls 41 around the pivot ring 40 above the swivel axis 42 which are thicker and heavier in weight than the lower side walls 43 around the pivot ring below the swivel axis 42.

The actuating means is actuating post 64 disposed above the pendulum head 36. The post 64 is connected to the means of locking the retractor 2. Preferably, the post 64 is connected to the lower side of the pawl 22 and the post 64 has a rounded portion 66 at its lower end which rests on the pendulum head 36. If the pendulum assembly 30 and gimbal assembly 38 are mounted on the outer side of one of the side walls 10 of the support structure 8, the pawl 22 must extend through such side wall 10 to be actuated by the actuating post 64 or the pawl and a ratchet wheel must be all on the outer side of one of the side walls 10.

Thus, the retractor has three separate pivoting actions: The first pivoting action is between the pendulum assembly 30 and the pivot ring 40. The pendulum head 36 pivots on the substantially circular support edge 52 which allows the pendulum assembly 30 to pivot in an infinite variety of lateral directions. The second pivoting action is between the pivot ring 40 and the trunnion 44. The pivot ring 40 pivots in two directions by means of pivot ring swivel axis 42 with reference to the trunnion 44. The third pivoting action is between the trunnion 44 and the support member 48. The trunnion 44 pivots in two directions by means of the trunnion swivel axis 46 with reference to the support member 48. Thus, the pivot ring 40 is adapted to pivot in an infinite variety of lateral directions because of the two directional pivoting of the pivot ring 40 with reference to the trunnion 44 in combination with the two directional pivoting of the trunnion 44 with reference to the support member 48.

The pivot ring 40 has a longitudinal axis 68 passing through the center of aperture 50 of pivot ring 40. The longitudinal axis 70 of the pendulum assembly 30 in its static position is substantially parallel and coincident with the longitudinal axis 68 of the pivot ring 40. The static position of the pivot ring 40 is adjustable in any direction from a static position wherein the longitudinal axis 68 of the pivot ring 40 is disposed at an angle of approximately 0° (FIGS. 1 and 2) to an angle 72 of approximately 30° (FIGS. 1 and 2) with reference to the longitudinal axis 74 of the retractor 2 or an axis 76 substantially parallel to the axis 74 of the retractor 2, or any angle between 0° and approximately 30°. In its static position, the pendulum assembly 30 acts as one unit with the pivot ring 40.

Thus, when the retractor 2 is disposed in the vehicle so that the longitudinal axis 74 of the retractor 2 is substantially vertical, the pivot ring 40 and pendulum assembly 30 assume an operable static position with the angle between both the longitudinal axis 68 of the pivot ring 40 and the longitudinal axis 70 of the pendulum assembly 30 being 0° with reference to the longitudinal axes 74 and 76 of the retractor 2. When the retractor 2 has been installed in a vehicle so that the longitudinal axis of the retractor is at an angle 72 of up to approximately 30° with the vertical plane, the pivot ring 40 and pendulum assembly 30 assume an operable static position with the longitudinal axis 68 of the pivot ring 40 and the longitudinal axis 70 of the pendulum assembly 30 being disposed at an angle of up to approximately 30° with reference to the longitudinal axis 74 or 76 of the retractor 2.

The pivot ring 40 and the pendulum assembly 30 are capable of adjusting automatically to an infinite variety of operable static positions. In all of the infinite variety of operable static positions to which the pivot ring 40 and pendulum assembly 30 are adjustable, the longitudinal axis 68 of the pivot ring 40 and the longitudinal axis 70 of the pendulum assembly 30 adjust to a position approximately parallel to the vertical plane. It is the longitudinal axis 74 of the retractor 2 that assumes an angle with reference to the vertical plane. This adjustment of the pivot ring 40 and pendulum assembly 30 takes place by means of the pivoting action between the pivot ring 40 and the trunnion 44 in combination with the pivoting action between the trunnion 44 and the support member 48. As a result, the retractor 2 may be installed in a vehicle in a tilted configuration of up to approximately 30° with reference to the vertical plane, or any angle between 0° and approximately 30°.

During normal operation of the retractor 2 after installation when the vehicle is not in a dangerous situation, the pendulum head 36 continues to rest on the support edge 50 in any one of its infinite variety of operable static positions. During normal operation of the retractor 2, when the vehicle is not in a dangerous situation, the pawl actuating post 64 rests in its unlocked position on top of the pendulum head 36. The actuating post 64 is connected to the underside of the pawl 22 and the pawl 22 remains in its unlocked position. FIGS. 1 and 2 show the pivot ring 40 and pendulum assembly 30 in their extreme static positions in phantom by dashed lines. Under such static conditions, the combined center of gravity of the pendulum assembly 30 and the pivot ring 40 is below the swivel axis 42 of the pivot ring 40. The pendulum assembly 30 and pivot ring 40 act as one unit and do not actuate the pawl 22.

When the acceleration, deceleration or change in orientation of the vehicle exceeds a predetermined magnitude, the pendulum head 36 is lifted up and off the support edge 50. Such movement of the pendulum head 36 lifts the actuating post 64, which in turn lifts the engaging side 23 (FIG. 2) of the pawl 22, causing the pawl 22 to pivot into engagement with the ratchet wheels 26. Under such dynamic conditions, the center of gravity of the pendulum assembly is below the swivel axis 42. The center of gravity of the pivot ring 40, with its thicker upper side walls 41, is above the swivel axis 42. The pivot ring 40 and pendulum assembly 30 act independently and pivot in opposite directions due to force components in a horizontal plane.

The pendulum assembly 30, pivot ring 40, trunnion 44 and support member 48 provide a simple, but effective, vehicle-sensitive inertia-operated mechanism adapted to lock the retractor 2 and thereby restrain an occupant of the vehicle during emergency situations. As a result, when the vehicle is subjected to sudden braking, cornering or overturning, for example, the pendulum assembly 30 causes the ratchet wheels 26 to prevent the belt from being withdrawn any further from the retractor 2, thereby restraining the occupant of the vehicle wearing the safety belt. The pendulum assembly 30, pivot ring 40, trunnion 44 and support member 48 are highly reliable in operation and inexpensive to manufacture. A typical location for this retractor is on the back of a seat where the angle of orientation of the retractor changes with the position of the seat.

We claim:

1. In a vehicle-sensitive, inertia operated safety belt retractor having a reel for winding a safety belt, means to lock the reel and thereby restrain an occupant of a vehicle during emergency situations, an inertia mechanism, a support assembly mounted on said retractor for supporting the inertia mechanism, and an actuating means responsive to said inertia mechanism for operating the means for locking the reel; the improvement wherein:

said inertia mechanism is a pendulum assembly which includes a pendulum head in contact with said actuating means, said pendulum assembly being actuated by forces exceeding a predetermined magnitude resulting from a sudden change in the motion or orientation of the vehicle, said actuation means operating directly on the means for locking the reel without any intermediate mechanism disposed structurally or operatively between said actuating means and said means for locking the reel; and said support for said pendulum assembly is a gimbal assembly which includes: a pivot ring which is a concave vessel having a substantially circular support edge upon which said pendulum head is disposed, said pendulum assembly being adapted to pivot upon said support edge in an infinite variety of lateral directions, said pendulum assembly requiring a force exceeding a predetermined magnitude to lift a part of the pendulum head up and off a part of said support edge before said pendulum assembly will cause said locking means to lock the reel; a swivel axis for said pivot ring adapted to allow said pivot ring to pivot in two lateral directions, a trunnion for supporting said pivot ring; a swivel axis for said trunnion adapted to allow said trunnion to pivot in two lateral directions, said trunnion swivel axis being disposed approximately perpendicular to said pivot ring swivel axis, and a support member for said trunnion, said gimbal assembly thereby being adapted to pivot in any lateral direction to an infinite variety of operable static positions to which said gimbal assembly is adjustable with reference to said retractor according to the position in which the retractor is oriented by virtue of installation in the vehicle; upon actuation by forces resulting from a sudden change in the motion or orientation of the vehicle said pivot ring and said pendulum assembly having independent action and pivoting in opposite directions; said pendulum assembly and said gimbal assembly having a compact configuration, sufficiently compact for said pendulum assembly and said gimbal assembly to be mounted either within said retractor or outside said retractor.

2. The vehicle-sensitive, inertia-operated safety belt retractor according to claim 1 wherein:
said actuating means is an actuating post disposed above said pendulum head, said actuating post being connected to said means for locking said reel, said actuating post being disposed in an unlocked position when said pendulum assembly is at rest and said actuating post being moved to said locked position by said pendulum assembly during dangerous situations to lock said reel and prevent further unwinding of said belt.

3. The vehicle-sensitive, inertia-operated safety belt retractor according to claim 1 wherein:
said pivot ring further comprises two swivel axles disposed on opposing sides of said pivot ring, said swivel axles forming said pivot ring swivel axis upon which said pivot ring pivots in two lateral directions; and
said trunnion further comprises two swivel axles disposed on opposing sides of said trunnion, said trunnion swivel axles forming said trunnion swivel axis upon which said trunnion pivots in two lateral directions.

4. The vehicle-sensitive, inertia-operated safety belt retractor according to claim 1 wherein:
said retractor has a longitudinal axis;
said gimbal assembly has a longitudinal axis which is approximately perpendicular to the swivel axis for the pivot ring; and
said gimbal assembly is adjustable in any direction from a static position wherein said longitudinal axis of said gimbal assembly is disposed at an angle of approximately 0° to an angle of approximately 30° with reference to the longitudinal axis of said retractor.

5. The vehicle-sensitive, inertia-operated safety belt retractor according to claim 1 wherein:
said retractor further includes a support structure including two parallel side walls and a back wall, said side walls being disposed approximately perpendicular to said back wall; and
said trunnion support member is disposed between and supported by said side walls.

6. The vehicle-sensitive, inertia-operated safety belt retractor according to claim 1 wherein:
said pendulum assembly further includes a pendulum weight and a pendulum rod;
said pendulum rod has an upper end and a lower end, said upper end of said pendulum rod being connected to said pendulum head, said lower end of said pendulum rod being connected to said pendulum weight; and
said pivot ring is a concave vessel having a bottom central portion and an aperture in said bottom central portion, said circular support edge being disposed around said aperture, said pendulum rod being disposed through said aperture.

* * * * *